United States Patent [19]

Watanabe

[11] Patent Number: 5,183,120

[45] Date of Patent: Feb. 2, 1993

[54] LAWN CUTTING APPARATUS

[75] Inventor: Hayataro Watanabe, Hachioji, Japan

[73] Assignee: Y.M. Golf Course Equipment Co., Ltd., Tokyo, Japan

[21] Appl. No.: 762,995

[22] Filed: Sep. 20, 1991

[30] Foreign Application Priority Data

Jan. 21, 1991 [JP] Japan ................. 3-005822[U]

[51] Int. Cl.⁵ ............................................. A01B 45/02
[52] U.S. Cl. ........................................ 172/21; 56/256; 30/348; 30/DIG. 5
[58] Field of Search ..................... 172/13, 15, 19, 21, 172/531, 556; 30/DIG. 5, 348, 356; 56/255, 256, 295

[56] References Cited

U.S. PATENT DOCUMENTS

| | | | |
|---|---|---|---|
| 864,812 | 9/1907 | Thuillier | 30/348 |
| 1,551,647 | 9/1925 | Dyson | 30/DIG. 5 |
| 1,727,648 | 9/1929 | Jarvis | 30/348 |
| 2,312,569 | 3/1943 | Maga | 30/DIG. 5 |
| 3,102,376 | 9/1963 | Henderson | 172/15 |
| 3,570,229 | 3/1977 | Freedlander et al. | 56/295 |
| 4,653,590 | 3/1987 | Shank | 172/15 |
| 5,036,651 | 8/1991 | Nelson | 172/21 |

FOREIGN PATENT DOCUMENTS 60-179107 11/1985 Japan .
62-91910 6/1987 Japan .
63-44801 2/1988 Japan .
1-101802 4/1989 Japan .

OTHER PUBLICATIONS

Howard, "Turf-Quaker" Flyer, Jan. 1981.

Primary Examiner—David H. Corbin
Assistant Examiner—Spencer Warnick
Attorney, Agent, or Firm—Armstrong, Westerman, Hattori, McLeland & Naughton

[57] ABSTRACT

With a view to accelerating growth of lawn in the fairway of golf course, or other lawn-covered ground, there is provided a lawn cutting apparatus which forms incised grooves of a predetermined depth in the lawn-covered grown surface by rotating of the cutting blade. Using this cutting blade, contact-resistance between the cutting blade and the inner faces of the incised grooves can be made as low as possible at the time of forming the incised grooves, and the incised part of the lawn covered ground can be finished with good outer appearance. A lawn cutting apparatus, wherein a plurality of cutting blades, each being in a substantial form of a prominently curved broadax, are mounted on a blade mounting shaft which is rotatably provided in substantially parallel with the wheel axle of the self-propelling vehicle, and outwardly protruded ribs are provided on both lateral faces of each of the cutting blades in a substantially arcuate shape along the edge of the cutting blade in the form of a prominently curved broadax.

1 Claim, 2 Drawing Sheets

LAWN CUTTING APPARATUS

BACKGROUND OF THE INVENTION

1) Field of the Invention

This invention relates to a lawn cutting machine, and, more particularly, it is concerned with an apparatus for incising the lawn-covered ground surface to form grooves in stripes in such surface as, for example, the lawn-covered fairway of a golf course.

2) Description of Prior Arts

Unlike ordinary farming ground, the lawn-covered ground such as the golf course as mentioned above has so far been not suited for soil-renewing work by plowing and hoeing, etc.. On account of this, it has heretofore been a practice to accelerate growth of the lawn by forming incised grooves in stripes of a predetermined depth in the lawn-covered ground so as to facilitate penetration of water, oxygen in the air, manures, or else into the neighboring area of the roots of the lawn.

As the expedients for forming the incised grooves as mentioned above, there have been known a variety of contrivances such as one, in which planar cutting blades are swingably mounted on a self-propelling vehicle in its forward-backward direction, and this self-propelling vehicle is driven forward in the state of the cutting blades being inset into the soil, while they are being swung back and forth (vide: for example, laid-open Japanese patent application No. 1-101802); or one, in which the cutting blades are rotated to form the incised grooves (vide: for example, laid-open Japanese patent application No. 63-44801, laid-open utility model applications No. 60-179107 and No. 62-91910).

However, with the first-mentioned type of apparatus, wherein the incised grooves are formed by advancing the self-propelling vehicle, while swinging the cutting blades in the forward-and-backward direction, a large power is required, because of high resistance to cutting the soil by the cutting blades, when they are driven forward, with the consequence that the cutting machine must be of a large and complicated construction, which inevitably leads to increase in its manufacturing cost and its weight to possibly damage the lawn, or other undersirable phenomena.

On the other hand, with the second-mentioned type of the lawn cutting apparatus, which forms the incised grooves by rotation of the cutting blades, the resistance to the forward movement of the apparatus is lower than that in the first-mentioned apparatus which moves forward with the cutting blade being set in the lawn-covered ground. On the contrary, however, this type of apparatus produces a large contact-resistance between the cutting blade and the inner surface of the cut grooves, and moreover, it is not always possible to cut the roots of the lawn and other subterranean stems in the ground with the consequent disadvantage such that roots, stems, or soil come up, not infrequently, to the ground surface to make it difficult to finish the incision of the grooves which give good external appearance.

SUMMARY OF THE INVENTION

The present invention has been proposed to solve the above-described points of problem, and aims at providing a lawn cutting apparatus of a type, as in the latter-mentioned apparatus to form the cut grooves by rotation of the cutting blades, which is capable of reducing the contact resistance between the cutting blade and the inner faces of the cut grooves, and, at the same time, of finishing the incision of the grooves with good outer appearance.

According to the present invention in general aspect of it, there is provided a lawn cutting apparatus, wherein a plurality of cutting blades, each being in a substantial form of a prominently curved broadax (halbert), are mounted on a blade mounting shaft which is rotatably provided substantially parallel with the wheel axle of the self-propelling vehicle, and outwardly protruded ribs are provided on both lateral faces of each of the cutting blades in a substantially arcuate shape along the edge of the cutting blade in the form of a strongly curved broadax.

The foregoing object, other objects as well as specific construction and function of the lawn cutting (incising) apparatus according to the present invention will become more apparent and understandable from the following detailed description thereof, when read in conjunction with the accompanying drawing.

BRIEF DESCRIPTION OF THE ACCOMPANYING DRAWING

DETAILED DESCRIPTION OF PREFERRED EMBODIMENT

By forming each cutting blade in the form of a prominently curved broadax (halbert), as already mentioned in the foregoing, it is possible to cut the roots of the lawn and the subterranean stems in a manner to rub them with the cutting blade, and, at the same time, by forming on each of these cutting blades ribs which are provided outwardly of both lateral faces thereof in a substantially arcuate shape along the edge of the cutting blade in the form of a strongly curved broadax, the contact resistance between the cutting blades and the incised grooves is reduced due to the grooves being made wide-open by the outwardly protruded ribs, whereby it becomes possible to form the incised grooves quickly and with good finish.

Figure 1:
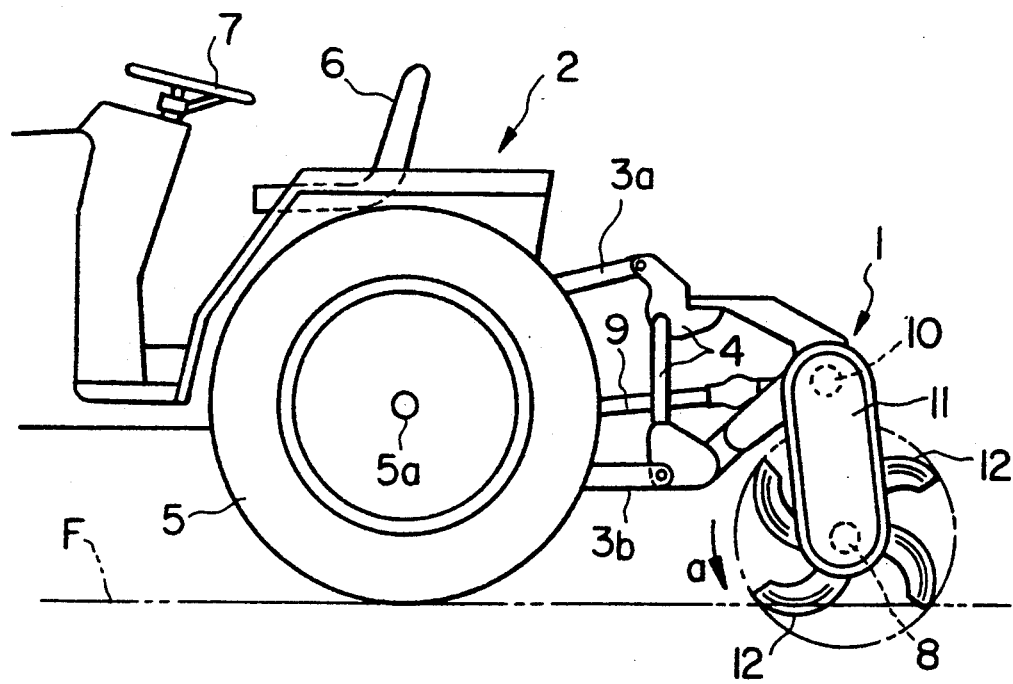
FIG. 1 is a side elevational view of one embodiment of the lawn cutting (incising) apparatus according to the present invention.
Figure 2:
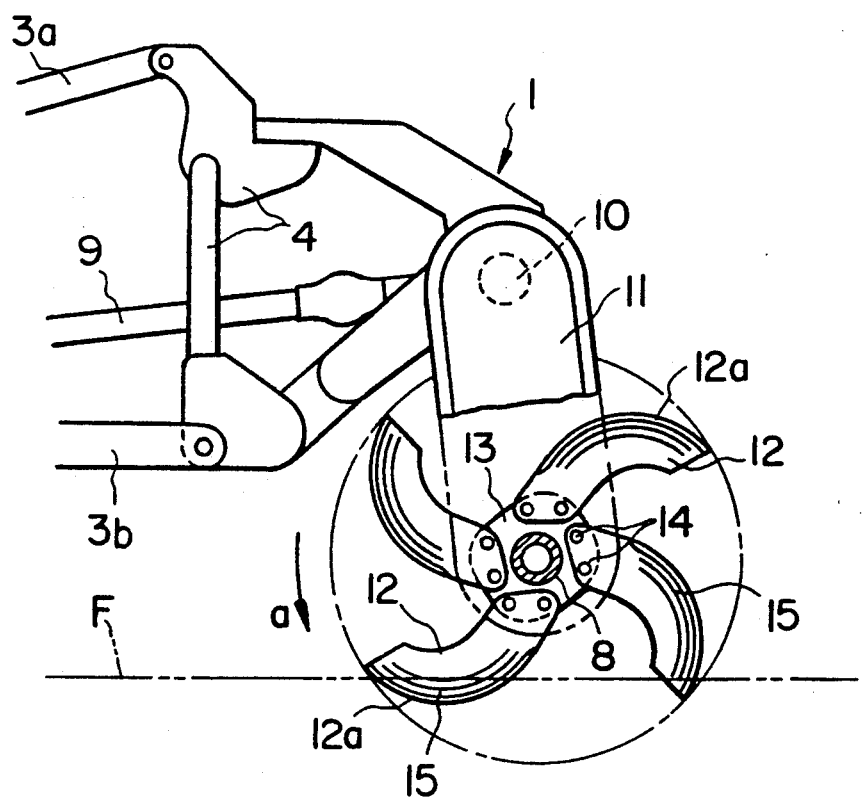
FIG. 2 is an enlarged side elevational view showing the main part of the lawn cutting blade.

FIG. 1 is a side elevational view showing one embodiment of the lawn cutting apparatus according to the present invention, and FIG. 2 is an enlarged side elevational view showing the main part of the lawn cutting blade.

In the drawing, a reference numeral 1 designates a lawn cutting apparatus which is mounted on the rear part of a self-propelling vehicle 2 such as a tractor, etc. in a manner to be movable up and down by means of a three-point link made up of a top link 3a and a pair of lower links 3b; a numeral 4 refers to a connecting attachment of the abovementioned cutting apparatus 1 to the self-propelling vehicle 2; a numeral 5 refers to travelling wheels (rear wheels) of the self-propelling vehicle 2; a reference numeral 5a denotes an axle of the travelling wheels; a numeral 6 refers to an operator's seat; and 7 represents a steering handle.

The abovementioned lawn cutting apparatus 1 is so constructed that a cutting-blade mounting shaft 8 is provided in a manner to be substantially parallel with the abovementioned wheel axle 5a and to be freely rotatable, and it can be rotatably driven by way of a transverse shaft 10 extending from a power take-out shaft 9 of the self-propelling vehicle 2 and a chain, or other expedient (not shown in the drawing). A reference numeral 11 designates a chain case.

According to the present invention, a plurality of the cutting blades 12 are mounted on and around the abovementioned cutting blade mounting shaft 8 in its circumferential direction. In the illustrated embodiment, four cutting blades 12 are fixed, in a detachably mountable manner, by means of screw-threaded bolts 14 or the like, on a supporting plate 13 provided on the cutting blade mounting shaft 8, and these four cutting blades 12, as one unit, are arranged in the circumferential direction, and a plurality of units of such cutting blades are disposed at a substantially equal distance among them in the axial direction of the cutting blade mounting shaft 8.

Figure 3:
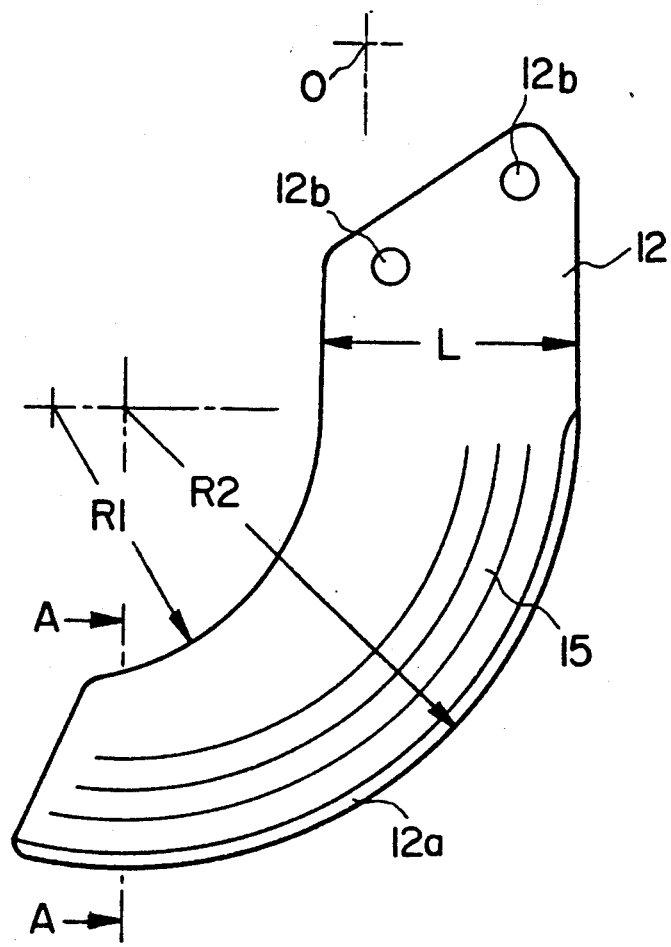
FIG. 3 is an enlarged view of the cutting blade.
Figure 4:
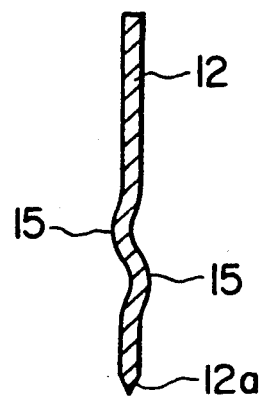
FIG. 4 is an enlarged cross-sectional view taken along the line A—A in FIG. 3.

As shown in FIG. 3, each of the cutting blades 12 is made in a substantial form of a prominently curved broadax (halbert) and outwardly protruded ribs 15 are provided on both lateral faces of the cutting blade in a substantially arcuate shape along the edge of the blade 12a which is formed on the outer periphery thereof. Particularly, in the illustrated embodiment, these outwardly protruding ribs 15 are formed on both lateral faces of the cutting blade 12 by bending the planar surface of the blade in an S-shaped cross-sectional profile, as shown in FIG. 4. In FIG. 3, a reference numeral 12b refers to fixing holes for the cutting blade, and a letter "O" denotes a rotational center of the cutting blade 12.

For the sake of reference, the principal sizes in each part of the cutting blade in the above-described embodiment of FIG. 3 are as follows: width (L)=90 mm; radius (R1)=95 mm; radius (R2)=160 mm; and thickness of blade 12 (t)=about 3 mm.

With the above-described construction, when the incised grooves are to be formed in the lawn-covered ground surface such as in the fairway of a golf course, the height of the lawn cutting apparatus 1 is adjusted by the three-point links 3a and 3b to thereby establish the depth of penetration of the cutting blades 12 into the soil at a predetermined value (e.g., about 10 to 20 cm). When the power outlet shaft 9 is rotated, while advancing the self-propelling vehicle 2, the cutting blade mounting shaft 8 is rotated at a predetermined rate in the direction of an arrow a in FIG. 2 through the transverse shaft 10 and the chain, etc. (not shown in the drawing), whereby the cutting blades 12 sequentially penetrate into the soil to smoothly sever the roots of the lawn and the subterranean stems in a manner to rub them by the blade edges 12a of the cutting blades 12 in the form of a prominently curved broadax, and the grooves in stripes are thus incised in the surface F of the lawn-covered ground.

In this case, the incised grooves are formed broader than the thickness of the cutting blades 12 per se, due to their being pushed wide-open sidewise by the ribs 15 formed on both lateral faces of the cutting blades 12, whereby the contact-resistance between the inner surfaces of the abovementioned incised groove and the two lateral faces of the cutting blades 12 which come after the abovementioned ribs 15 of the preceding blade in the rotational direction becomes reduced, and the rotational resistance of the cutting blade 12 is lessened accordingly.

Moreover, since the abovementioned externally protruding ribs 15 are formed in an arcuate shape along the blade edge 12a provided on the outer periphery of the cutting blade in the form of a prominently curved broadax, the blade can be slipped out easily from the incised groove, hence there is no possibility of roughening the surface of the lawn-covered ground due to coming up of the soil, roots and stems of the lawn.

Further, when the outwardly protruded ribs 15 on both lateral surfaces of the cutting blade 12 are formed in an S-shaped cross-sectional profile, as in the illustrated embodiment, any shock to occur when the blade edge 12a hits the foreign substances such as stones, gravels, sands, etc. can be reduced, hence bending, or breaking of the cutting blade 12 can be advantageously prevented.

As has so far been explained in the foregoing, the lawn cutting apparatus according to the present invention is so constructed that a plurality of cutting blades 12 are mounted circumferentially on and around the cutting blade mounting shaft 8 which is rotatably provided substantially parallel with the travelling wheel axle 5a of the self-propelling vehicle 2, and that each cutting blade 12 is formed in a substantial shape of a strongly curved sword, whereby the roots of the lawn and the subterranean stems can be efficiently cut in a manner to rub them with the cutting blade, and, by providing the extertnally protruded ribs 15 on both lateral faces of each cutting blade, the incised grooves can be pushed wide-open sidewise by the protruded ribs 15, which is broader than the thickness of the cutting blade 12, whereby the contact-resistance between the lawn and the cutting blade is reduced, and the incised grooves can be formed with less power. In addition, since the outwardly protruded ribs 15 are formed in a substantially arcuate shape along the blade edge 12a of the cutting blade 8 in the shape of a prominently curved broadax, its slipping-off from the incised grooves is easy, hence there is no possibility of the lawn-covered ground surface being roughened by the floating of the soil, and the roots and stems of the lawn, which enables the incised part of the groove to be finished with good outer appearance. Accordingly, restoration of the lawn after the cutting work is very fast, which makes it possible for the golf players to play golf without substantial difficulty even right after the lawn cutting work.

Although, in the foregoing, the present invention has been described with particular reference to preferred embodiments thereof for its construction and function, it should be noted that the invention is not limited to these embodiments alone, but any changes and modifications may be made to it without departing from the spirit and scope of the invention as set forth in the appended claims.

What is claimed is:

1. A lawn-ground cutting apparatus, wherein a plurality of cutting blades, each being in a substantial form of a prominently curved broadax, each blade having an outer radius defining a cutting edge of each cutting blade, are mounted on a blade mounting shaft which is rotatably provided substantially parallel with a wheel axle of a self-propelling vehicle, the edge of each cutting blade facing in a rotational direction of the blade mounting shaft, and outwardly protruded ribs are provided on both lateral faces of each of the cutting blades in a substantially arcuate shape running substantially parallel to the edge of the cutting blade.

* * * * *